(12) United States Patent
Bush et al.

(10) Patent No.: US 9,099,858 B2
(45) Date of Patent: Aug. 4, 2015

(54) SYSTEM AND METHOD FOR ASSURING UTILITY NETWORK SECURITY AND RELIABILITY

(75) Inventors: Stephen Francis Bush, Latham, NY (US); Michael Joseph Mahony, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 418 days.

(21) Appl. No.: 13/077,680

(22) Filed: Mar. 31, 2011

(65) Prior Publication Data

US 2012/0249286 A1   Oct. 4, 2012

(51) Int. Cl.
*G05B 23/02* (2006.01)
*H02H 1/00* (2006.01)
*H02H 7/26* (2006.01)
*H04L 29/06* (2006.01)

(52) U.S. Cl.
CPC ............. *H02H 1/0061* (2013.01); *H02H 7/261* (2013.01); *H04L 63/1416* (2013.01); *Y04S 40/24* (2013.01)

(58) Field of Classification Search
CPC ........ G05B 23/02; G05B 23/027; G05B 9/03; G05B 19/0428; G05B 19/4184; G05B 2219/13; H01H 33/6606; H01H 75/04; H01H 33/6662; H01H 2033/6623; H01H 33/027; H01H 47/325; G01W 1/00; G01W 1/02; G01W 1/10; H04W 4/02; H04W 4/22; H04W 76/007; H04L 29/06027; H04L 65/4076; H04L 65/605; H04L 65/607; G08B 25/085; H02G 13/00; G01C 15/00; B60Q 9/008

USPC .......... 340/3.43, 3.44; 455/452.2, 67.13, 135, 455/160.1, 277.2; 700/292, 295; 370/332, 370/333

See application file for complete search history.

(56) References Cited

U.S. PATENT DOCUMENTS

| | | | |
|---|---|---|---|
| 5,729,144 A | 3/1998 | Cummins | |
| 6,600,973 B1 * | 7/2003 | Folts et al. | 700/297 |
| 8,326,319 B2 * | 12/2012 | Davis | 455/456.1 |
| 2002/0120723 A1 * | 8/2002 | Forth et al. | 709/221 |
| 2003/0161084 A1 | 8/2003 | Potts et al. | |
| 2004/0257216 A1 * | 12/2004 | Parker et al. | 340/507 |
| 2008/0077336 A1 | 3/2008 | Fernandes | |
| 2008/0125984 A1 | 5/2008 | Skendzic et al. | |
| 2009/0240449 A1 | 9/2009 | Gibala et al. | |
| 2010/0013632 A1 | 1/2010 | Salewske et al. | |
| 2010/0152910 A1 | 6/2010 | Taft | |
| 2011/0046809 A1 * | 2/2011 | Fickey | 700/293 |
| 2011/0153236 A1 * | 6/2011 | Montreuil et al. | 702/59 |
| 2012/0112901 A1 * | 5/2012 | Chasko | 340/517 |

\* cited by examiner

*Primary Examiner* — George Bugg
*Assistant Examiner* — Sharmin Akhter
(74) *Attorney, Agent, or Firm* — Nitin N. Joshi (57) ABSTRACT

A system and method for detecting a utility network threat based on the quality of communications received at devices in the utility network. The quality of a communication signal received by a device in the utility network is determined and a threat to the utility network is determined based on the signal quality. Threat information is output to devices on the utility network.

22 Claims, 8 Drawing Sheets

SYSTEM AND METHOD FOR ASSURING UTILITY NETWORK SECURITY AND RELIABILITY

BACKGROUND

A modern society is served by utilities that must function with extremely high reliability. Proper functioning is typically expressed by reliability, availability, and accountability. In order to reliably and efficiently meet growing demands, utilities, such as electric utilities, are developing and implementing technologies to create an intelligent infrastructure, such as a "smart grid" infrastructure for the power grid. In order to realize an intelligent infrastructure, there must be an embedded or overlaid communications architecture by which devices in the network can be securely accessed, controlled, and communicate with each other.

Communications in an intelligent infrastructure, such as the smart grid or other utilities, are affected by numerous events including faults and cyber security threats. For example, many causes of faults on the electrical power line can also impact communication among devices in the network. Thus, transient communication faults, manifested as dropped packets, for example, may be a precursor to an electric power line fault. In addition, cyber security threats, such as spoofing and denial of service attacks, for example, are deployed to disrupt operation, utility operation, and other communications in the utility network. In order to limit the potential damage of a cyber security threat, efforts are underway to enable awareness of potential threat events as well as their impacts in order to harden the utility communication infrastructure both proactively and in response to incidents.

Currently, there are methods and devices that are specifically used to detect the occurrence of a fault in a utility. For example, in an electric power line, most of the methods and devices rely on detection of an abnormal flow of electric current, such as an overcurrent or an undervoltage. There are also various methods being deployed to detect a cyber security threat to the utility network. Efforts to address both faults in a utility network and cyber security threats to the utility network have relied on separate methods and devices.

For these and other reasons, there is a need for embodiments of the present invention.

BRIEF DESCRIPTION

A system and method for detecting a utility network threat based on the quality of communications received at devices in the utility network. The quality of a communication signal received by a device in the utility network is determined and a threat to the utility network is determined based on the signal quality. Threat information is output to devices on the utility network.

DRAWINGS

Features and aspects of embodiments of the present invention will become better understood when the following detailed description is read with reference to the accompanying drawings in which like characters represent like parts throughout the drawings.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein are directed to security maintenance in a network of power grid devices. While embodiments of the invention will be described in the context of energy or electric utility networks, it will be appreciated by those skilled in the art that the method and system can be used for other types of networks as well.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As used herein, the term "module" refers to software, hardware, or firmware, or any combination of these, or any system, process, or functionality that performs or facilitates the processes described herein.

As used herein, the terms "signal quality," "communication quality," "communications," and "communication signal quality" are intended to include quality of any or all layers of communication in a layered network model, such as the OSI model.

Embodiments of the invention will be described with respect to reclosers as intelligent electronic devices (IEDs). However, it is to be understood that the invention is not limited to reclosers and that embodiments to any appropriate IED found in a power system network. IEDs can be arranged to control, monitor, protect, and/or automate an electric power system such as system 100. They can include, but are not limited to remote terminal units, differential relays, distance relays, feeder relays, overcurrent relays, reclosers, voltage regulator controls, breaker failure relays, automation controllers, for example. They can perform functions such as measuring and recording electrical and other type of switch related information such as voltage, current, reclosing times, monitoring switch status, operating switches and communicating information, for example.

According to embodiments of the invention, devices in a utility network having communication capability cannot only be used for their designated purpose but also be used as a type of sensor to detect potential network operating threats including, but not limited to, weather events, and cyber security events. In these embodiments, the quality of communication signals, including the quality of the data contained therein [SFB1] that are exchanged between devices in the network as part of their normal operation is determined and potential network operating threats can be detected based on the communication signal and data quality. In this way, communication signals not only transmit information, but can also be used to indicate a threat to the utility network. Communication can also include freespace optical and power line carrier communications.

Electrical power generation equipment, transmission and distribution power lines must be protected against temporary and permanent faults and consequent short and open circuits that may occur on the power lines. These faults could cause a collapse of the power system, serious and expensive equipment damage, and personal injury. Further, extensive power outages caused by these faults may give rise to angst among consumers that expect reliable and trustworthy utility service. It is the function of fault protection devices such as fuses, protective relays, and reclosers, for example, to assist in the isolation of power line faults and initiate isolation by tripping (i.e. opening) circuit breakers, sectionalizers, and reclosers. In addition, power distribution operators employ automatic power restoration components including, but not limited to tie switches to automatically restore electric service to consumers in the event of a protection fault or other system malfunction.

For ease of description, an exemplary embodiment describing reclosers will be discussed. However, it is to be understood that embodiments of the invention are not limited to reclosers or power utility networks, but can be applied to any appropriate fault detection method and device having communication capabilities in a utility network. In addition, an exemplary embodiment will be described with respect to wireless communication. Once again, embodiments of the invention are not limited to wireless communication and can be applied to any appropriate manner of communication.

Reclosers or other IEDs in an electrical power network are each equipped with communications equipment sufficient to communicate over a predetermined set of wireless and wired systems, including, but not limited to, power line carrier, land line telephony, electric utility radio, WiFi, WiMAX, and cellular telephony, for example.

Figure 1:
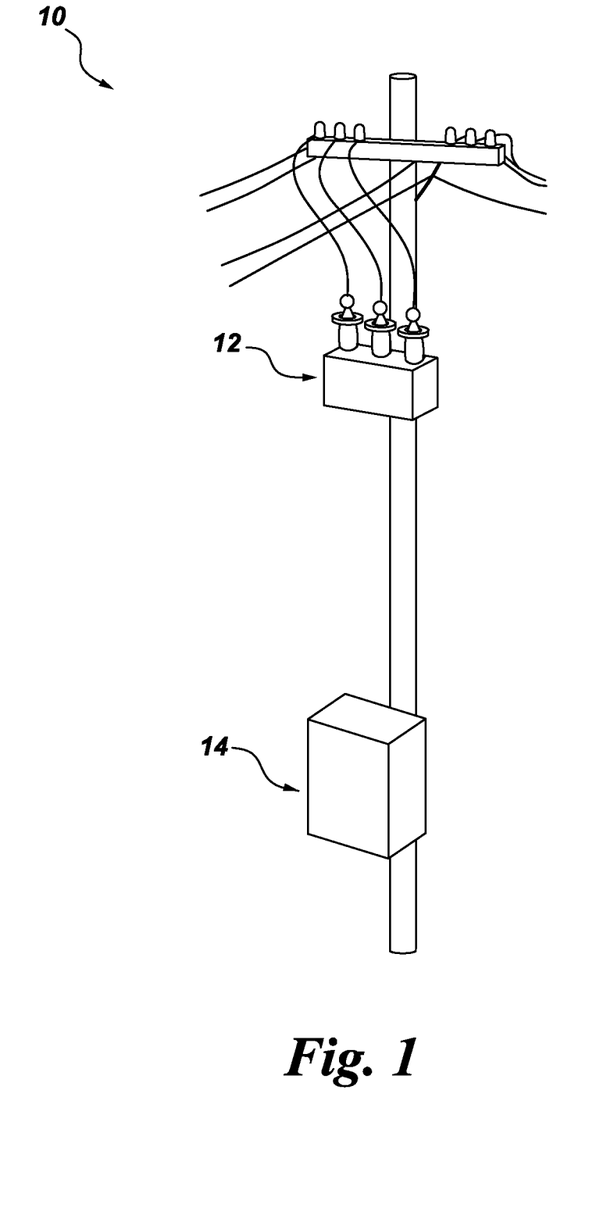
FIG. 1 is a diagrammatical representation of an electric utility pole used in electrical distribution systems.

FIG. 1 shows an electric utility pole 10 for use in electrical distribution systems to suspend power lines above the ground according to an exemplary embodiment. An automatic recloser device 12 with an associated controller 14 is mounted on an electric pole 10 to protect the distribution system. The controller 14 can be arranged separate from the recloser device 12, as shown, or the controller 14 can be integrated with the recloser device 12. The recloser 12 with the controller 14 is considered an IED. The combination of the recloser switch, associated controller, and communications subsystem will be referred to as the "recloser" or "recloser device" for the purposes of this disclosure. The function of the recloser device 12 is to provide life safety, protect equipment, and minimize power distribution interruptions caused by temporary or permanent faults. Typically, during a fault the current carried by the power lines will suddenly increase due to a short-circuit condition. The recloser senses this current rise and opens its breaker, thereby cutting off current flow in order to protect distribution system components and other equipment connected to the distribution system. Since many fault conditions are temporary, the recloser is designed to close after a short period of time, and determine if the fault is still present. Once the recloser closes and if the increased current is still present, it will again open. Such transition between open and closed may quickly occur several times before the recloser remains open if the fault is permanent. For example, during a thunderstorm, if lightning were to strike the distribution system, the power to a consumer may be temporarily disrupted for a few seconds, with the resulting recloser action causing lights and appliances to turn OFF (recloser opening), then ON (recloser closing) at consumer premises. If the lightning strike causes a downed line, then the recloser would remain open and the consumer would experience a longer period of disruption.

Figure 2:
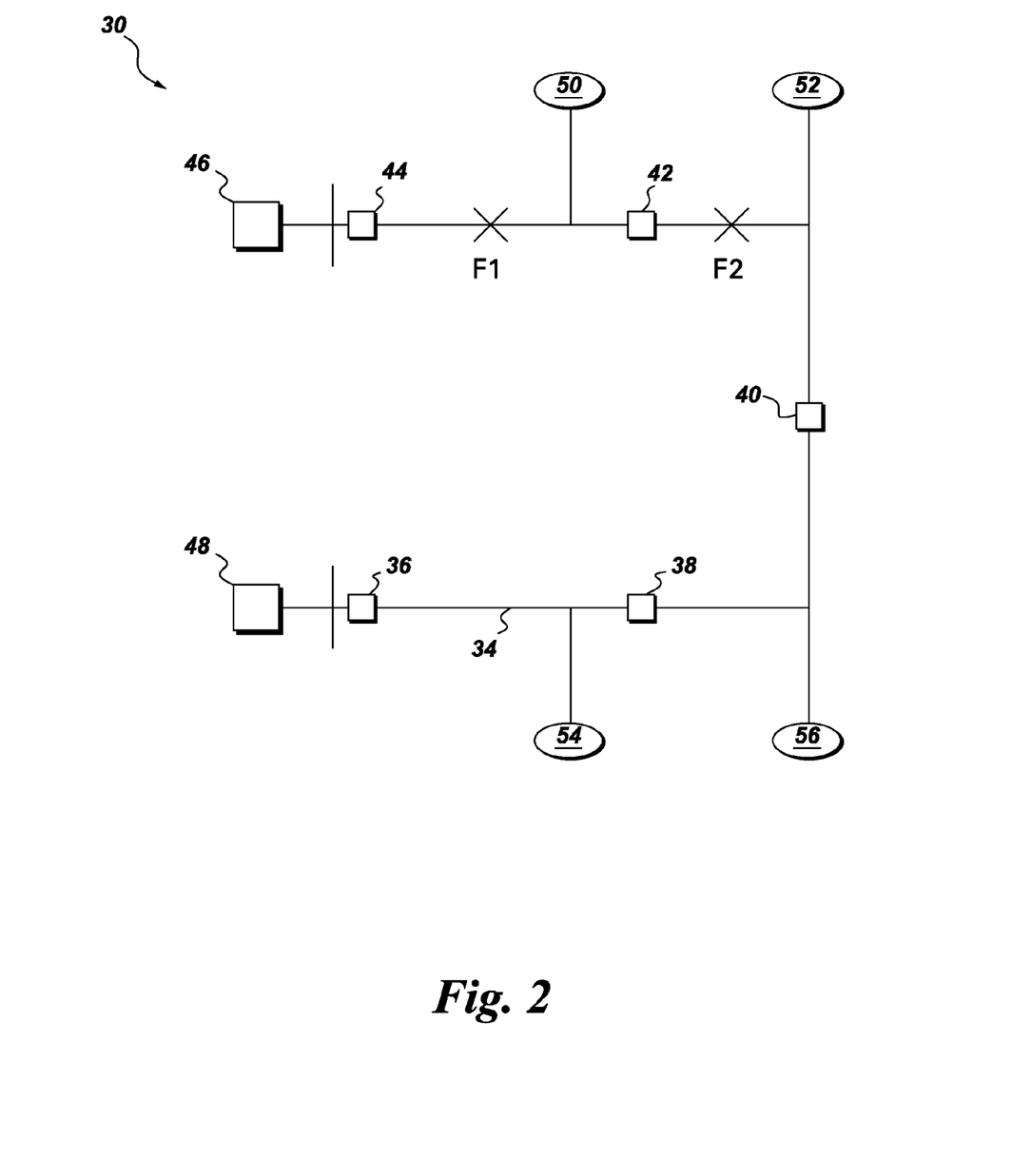
FIG. 2 is a diagrammatical representation of a recloser loop scheme according to an embodiment of the invention.

FIG. 2 shows a recloser loop scheme 30 in accordance with an exemplary embodiment. The recloser loop scheme 30 includes substations 46 and 48, with two feeders 32 and 34, and consumers 50, 52, 54, 56. Distribution feeders 32 and 34 are connected through a tie recloser switch 40. Although FIG. 2 only illustrates a small number of substations 46 and 48, feeders 32 and 34, consumers 50, 52, 54, and 56, and reclosers 36, 38, 42 and 44, it should be understood by those skilled in the art that the system can include any number of these devices as appropriate. During normal operation, tie recloser switch 40 is open and the distribution substations 46 and 48 provide electrical service to distribution feeders 32 and 34 respectively. Recloser loop scheme 30 includes four feeder reclosers 36, 38, 42, 44 and tie line recloser 40 coordinated with each other. The reclosers 36, 38, 42, 44 and 40 and/or the substations 46 and 48 include a controller, which will be described in detail below.

In operation, when a permanent fault occurs, for example at location F1, recloser 44 operates through its reclosing sequence, locks out, and transmits information regarding its status and the fault condition to the other reclosers over the communication network. After recloser 44 locks out, consumers 50 and 52 lose electrical services and experience an outage. Feeder recloser controllers (not shown) located at recloser 42 and tie switch 40 receive the information transmitted from recloser 44, and may also sense the loss of the feeder 32 voltage. Based on this aggregate information, recloser 42 opens. If substation 48 has sufficient capacity to backfeed consumers 52, tie switch 40 closes, and substation 48 restores electrical service to consumers 52. In this manner, the fault is efficiently isolated and only customers 50 loose electrical service.

Figure 3:
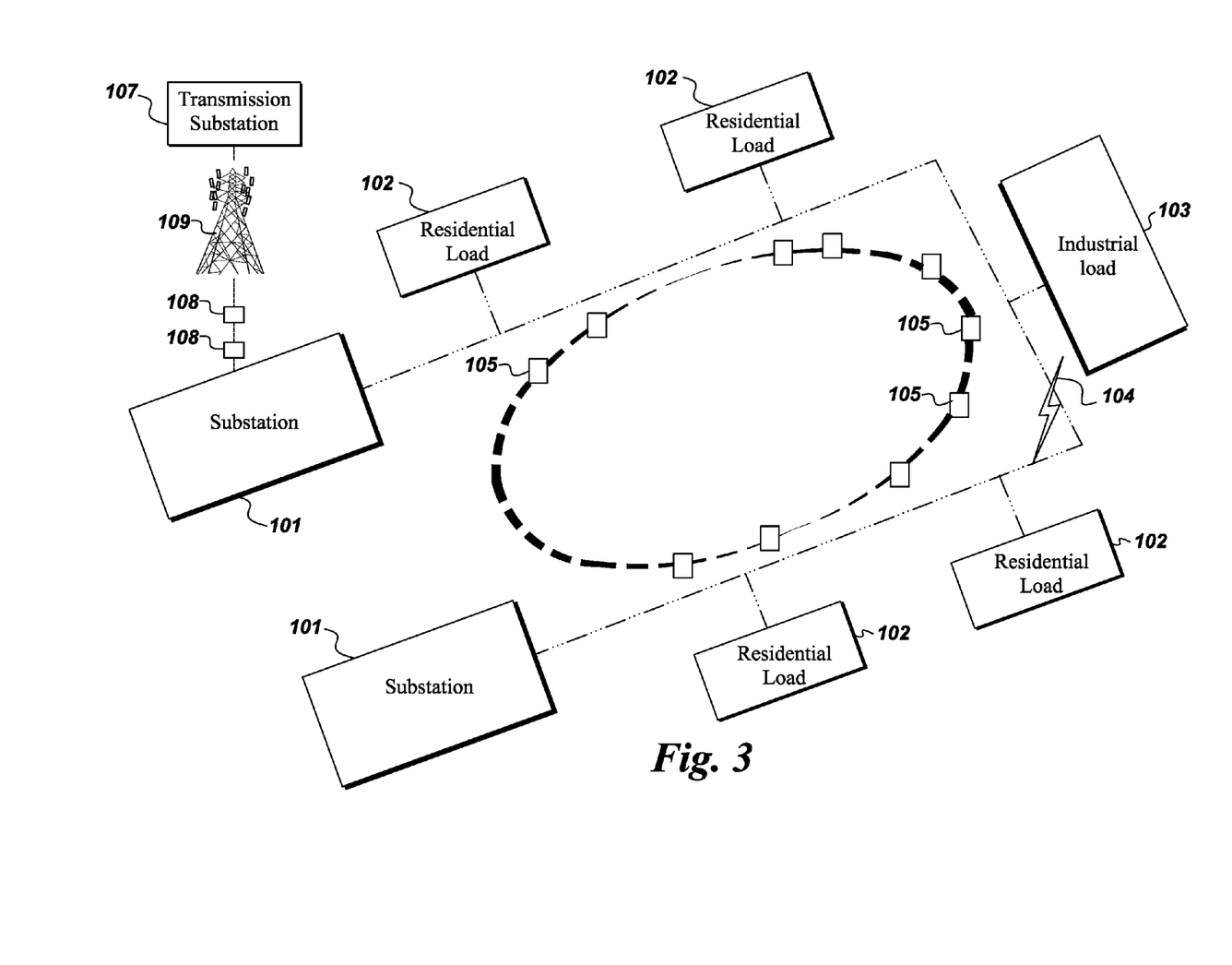
FIG. 3 is a diagrammatical representation of a utility network system according to an embodiment of the invention.

FIG. 3 shows a system 100 in accordance with an embodiment of the present invention. System 100 includes substations 101 that deliver power to residential areas 102 and an industrial site 103 and also includes intelligent electronic reclosers 105, for example. The system 100 also includes a transmission tower 109 for supplying power to the distribution substations 101 via transmission substations 107. IEDs 108 can also be arranged in the transmission portion of the network in addition to the IEDs or reclosers 105 in the distribution portion. In accordance with an embodiment of the present invention, any wireless network available within the system vicinity may be used for communication between various devices.

According to embodiments of the invention, the communication capabilities of the reclosers 105 can be extended so that communications between reclosers and/or other IEDs on the network operate not only to exchange information but also operate as a sensing mechanism to detect potential threats to the power utility network. For example, electromagnetic radiation resulting from lightning can interfere with communication. This interference can be detected by the reclosers 105 or other devices in the network and can act as an indicator of a potential operation threat to the utility network. Based on the expected parameters of communications between reclosers 105, a potential weather event such as a lightning strike can be detected based on the quality of the communication signal between reclosers. In addition, when the communication signal between reclosers falls outside of an expected range or threshold, it can be determined that there is a cyber security threat to the utility network.

For ease of description, embodiments of the invention will be described with respect to communication between reclosers and the parameters for determining communication signal quality will be described with respect to channel characteristics or parameters. However, it is to be understood that these are merely examples and that embodiments of the invention extend to any IEDs and any layer of a communication network such as those in the OSI model. Some parameters for other layers in the communication network can include, but are not limited to, packet round trip delay, cyclic redundancy check-sum, data error detection, for example.

According to exemplary embodiments of the invention, a channel model can be generated between each of the devices or reclosers in the network based on a number of parameters including, but not limited to, propagation delay, signal strength, bit error rate, frequency, and embedded GPS coordinates. The channel model between reclosers can be different based on the differences in the locations of the reclosers 105. When the quality of a communication signal between reclosers falls outside of an expected range or threshold, it can be determined that there is either a threat to the utility network.

For example, in the event of a weather event, each of the reclosers 105 in the network know their location, either by programmed data, GPS capability, or some other method. Once the potential threat is detected based on the quality of the communication signals between the reclosers, triangulation methods, for example, can be used to estimate the location of the fault or threat. In addition, the location information along with other information can be used to predict the path of a weather event, for example, and consequently predict the next location of a potential fault in the utility network. Reclosers or devices in the utility network receiving the prediction information could dynamically adjust their settings as necessary to respond to the information. Since lightning is a significant cause of power line faults, then the communications could be used to detect the lightning strikes while doing their normal operation, as well as potentially keep track of a weather event and anticipate or predict the location of future faults. Electromagnetic interference in a communication signal can also indicate a potential cyber security threat as well as a weather event. Based on the expected parameters of communications between reclosers 105, a potential cyber threat can be detected based on the quality of the communication signal and data contained therein between reclosers.

An example of a cyber threat to the network would be spoofing by an intruder. For example, if one of the reclosers in a communication exchange appeared to be moving, based on changes to its GPS coordinate data, or if its GPS position was not where it was expected to be, then it could be determined that there is a potential cyber threat such as spoofing occurring. Spoofing could pose a threat to the utility network by enabling an intruder to disturb electrical distribution by the utility. Security threats, such as cyber security spoofing or communication signal jamming, can also be detected based on a recloser's radio performance compared to a radio channel model. If the quality of the communication signal between these devices deviates from the expected model or characteristics, a security threat could be detected. For example, communications from a device located in a car parked next to a recloser 105 will have different channel characteristics, including multipath delay, than one recloser communicating with another. For example, since the car is much closer to the receiving recloser than any other recloser, the propagation delay will be very different than the expected propagation delay. In this example, the propagation delay would be much shorter than expected.

Embodiments described herein utilize devices or IEDs in a utility network having communication capability not only for their designated purpose but also for use as a type of sensor to detect potential network operating threats including, but not limited to, weather events, and cyber security events.

Figure 4:
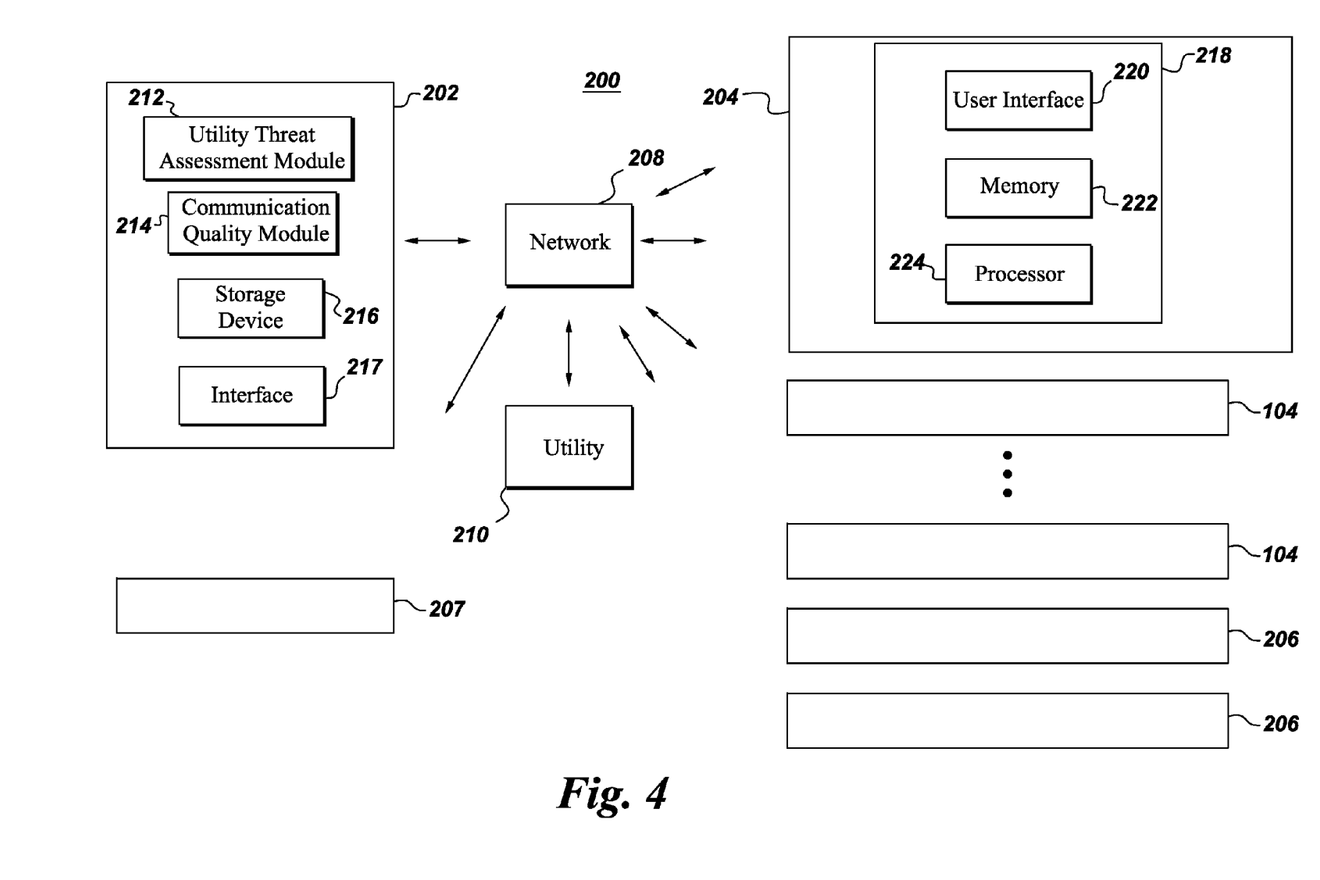
FIG. 4 illustrates a utility threat system according to an exemplary embodiment.

FIG. 4 illustrates a utility threat assessment system 200 according to an exemplary embodiment of the invention. The system 200 includes a utility threat assessment manager 202, devices or IEDs 204, substations 206, a transmission substation 207, and a utility 210 all coupled via network 208. Each of the devices 204 includes information identifying its location, either by a GPS device (not shown) within each of the devices 204, by information programmed into each of the devices 204, or by any other suitable means. In order to facilitate the description of embodiments of the invention, a single utility threat assessment manager 202 and a single utility source 210 are shown in FIG. 4, as well as a limited number of device 204 and substations 206 and 207. However, it should be understood by those skilled in the art that embodiments of the invention are not limited to these numbers, and that there can be any number of utility threat assessment managers, devices, service providers, substations, and control centers in a utility network. In addition, the utility threat assessment manager 202 can be arranged at and/or hosted by the utility 210, and/or the devices 204, and/or by any other party. Each device 204 shown in FIG. 4 includes a controller 218 having a processor 224, a memory or storage device 222, and an interface 224. The controller 218 for each of the devices 204 controls operation of the device to perform its normal operations and to communicate information to devices on the utility network including the utility threat assessment manager 202 via the network 208. Devices 204 communicate with the network 208 via wireless and/or wired systems, including, but not limited to, power line carrier, land line telephony, electric utility radio, WiFi, WiMAX, and cellular telephony, for example. The utility threat assessment manager 202 includes a utility threat assessment module 212, a communication quality module 214, an interface 217, and a memory or storage device 216. The communication quality module 214 analyzes communications received by a device 204 and determines the quality of the communication signal. This information is supplied to the utility threat assessment module 212, which determines whether the received communication represents a threat based on the quality of the communication or the data contained therein. Various factors can be implemented to determine whether the quality of the communication signal represents a potential utility threat including, but not limited to, channel characteristics such as propagation delay, signal strength, bit error rate, frequency, and embedded GPS coordinates, for example. Information relating to the devices 204, detected utility threats, time of utility threats, and other data are stored in the storage device 216, or some other memory or storage device or database.

Deviation from normal operating ranges for communications among the devices 204 can indicate a potential threat to the grid or utility, either by a weather event, downed line, or a cyber security threat, for example. In essence, according to disclosed embodiments, the quality of communication signals and the data signals therein at particular locations within the network of devices 204 is used to indicate potential utility threats where the devices 204 not only act as protective devices but also as sensors to sense or detect a potential threat to the grid or utility based on communication quality among the devices 204.

Figure 5:
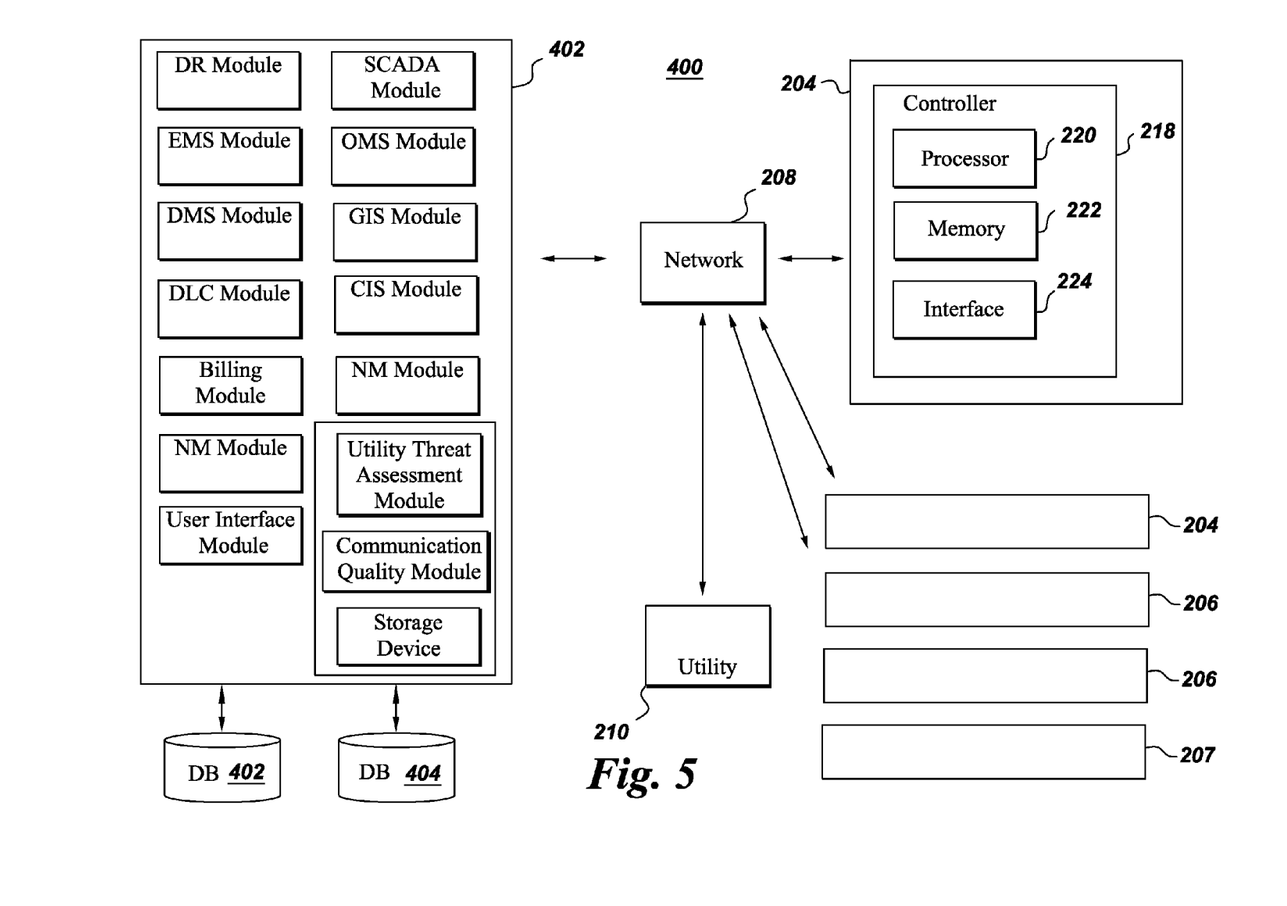
FIG. 5 illustrates a utility threat system according to another exemplary embodiment.

FIG. 5 shows another exemplary embodiment of the invention. In this embodiment of the system 400, the utility threat assessment manager 202 can be arranged physically and/or logically at one or more utility control centers 402. This could be considered a centralized system. In addition, the utility control center 402 can include an energy management system (EMS) module 404 that performs load forecasting for the network, and monitors, controls, and optimizes the performance of the generation and transmission system. A Supervisory Control And Data Acquisition (SCADA) module 406 provides real time information at different points in the grid and also provides local controls. An Outage Management System (OMS) module 408 monitors load status information and outage restoration information for the customer sites (not shown) in the network. Some of the functions performed by the OMS module 408 include failure prediction, providing information on the extent of outages and impact to customers, and prioritizing restoration efforts. The OMS module 408 operates based on a detailed network model of the distribution system that is generated and maintained by a Geographic Information Systems (GIS) module 410. A Distribution Management System (DMS) module 412 provides real-time response to adverse or unstable network conditions by providing information on load status and load response. The DMS module 412 manages the response to alarms and/or events. Customer information including service contract information, participation in incentive and/or demand response programs, and contract price information, for example, is monitored and controlled by the Customer Information System (CIS) module 414. A Direct Load Control (DLC) module 416 controls and manages customer site devices such as the thermostat—HVAC, water heater, pool pump, washer, dryer, dishwasher, LCD/Plasma TV, plug loads (e.g., computers, computer peripherals/accessories, fax machine, power supplies), refrigerator, and lighting, for example. These are mostly discrete types of devices that have on/off, eco-mode/normal mode, or multiple discrete power saving modes (e.g., dimmable lighting). Customer billing is performed by the billing module 418.

The utility control center 402 can further include a Demand Response (DR) module 420, a Network Management Services (NMS) Module 422, a user interface module 424, a system database (DB) 426, and a program database (DB) 428. The system database 426 can store various types of data such as historical data for each customer sites in the network, any customer information, as well as any grid or utility threat assessment information and/or information used to generate utility threat assessment information, and data related to response to utility threat assessments, for example. The information in the system database 426 can be updated as necessary. The program database 428 stores various applications and programs implemented by the utility control center 402.

Figure 6:
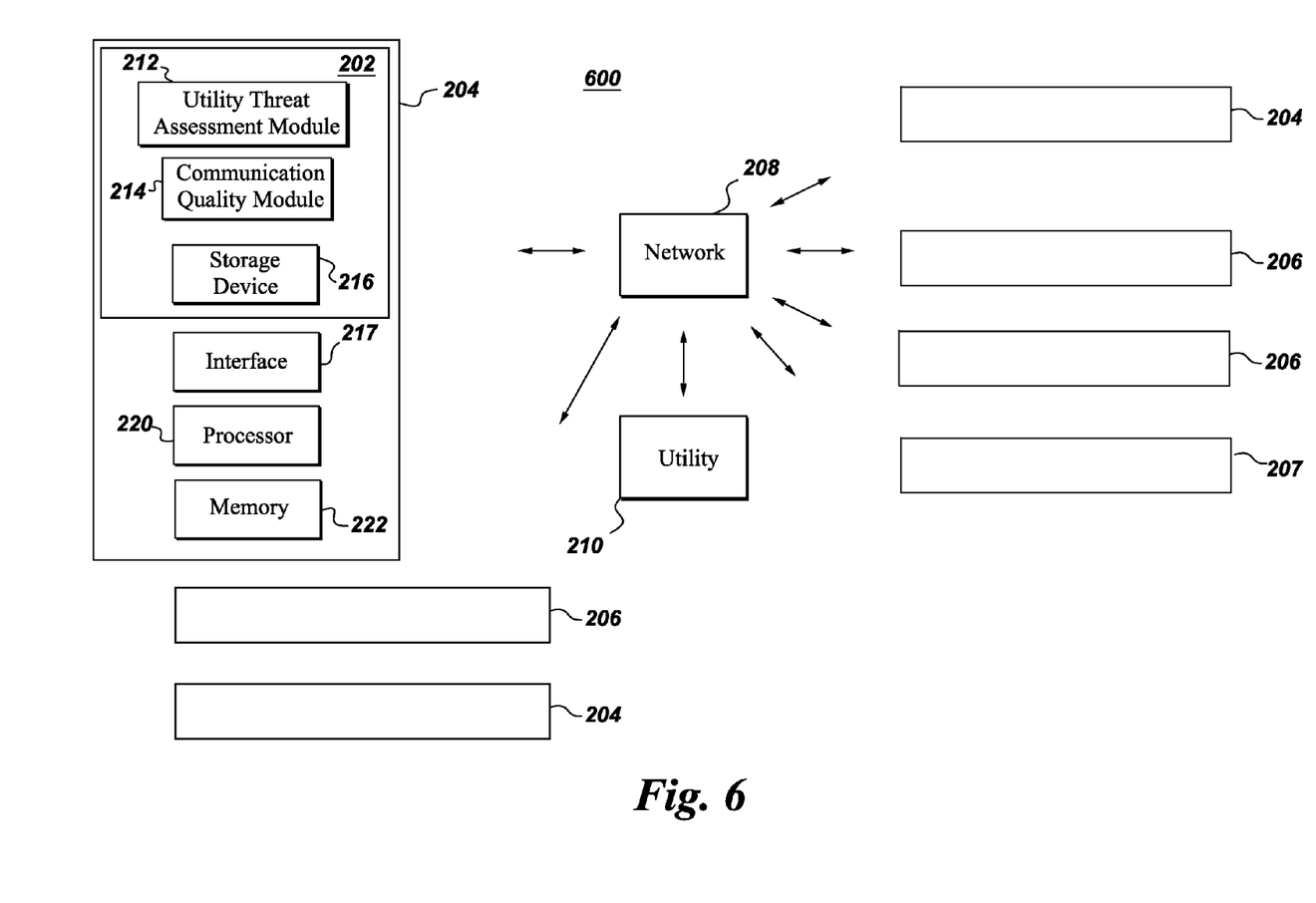
FIG. 6 illustrates another utility threat system according to an embodiment of the invention.
Figure 7:
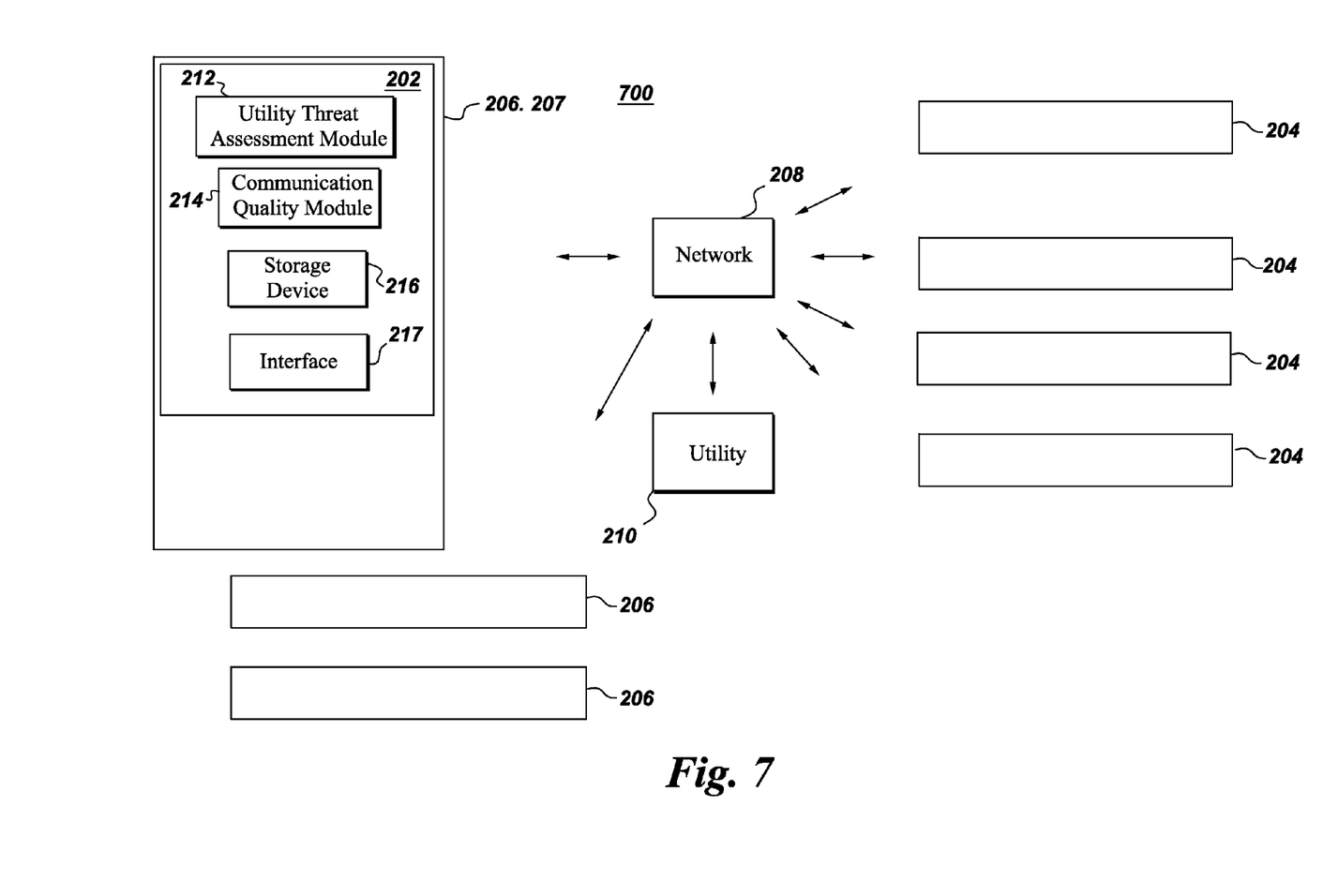
FIG. 7 illustrates yet another utility threat system according to an embodiment of the invention.

In another exemplary embodiment, the utility threat assessment manager 202 can be arranged physically and/or logically in each of the devices 204 in a distributed system, as shown in FIG. 6. In this arrangement, each of the devices 204 performs grid threat assessments and shares the information with other devices 204, substations 206, 207 and the utility 210. In other embodiments, the utility threat assessment manager 202 can be arranged physically and/or logically in each of the substations 206, as shown in FIG. 7.

Figure 8:
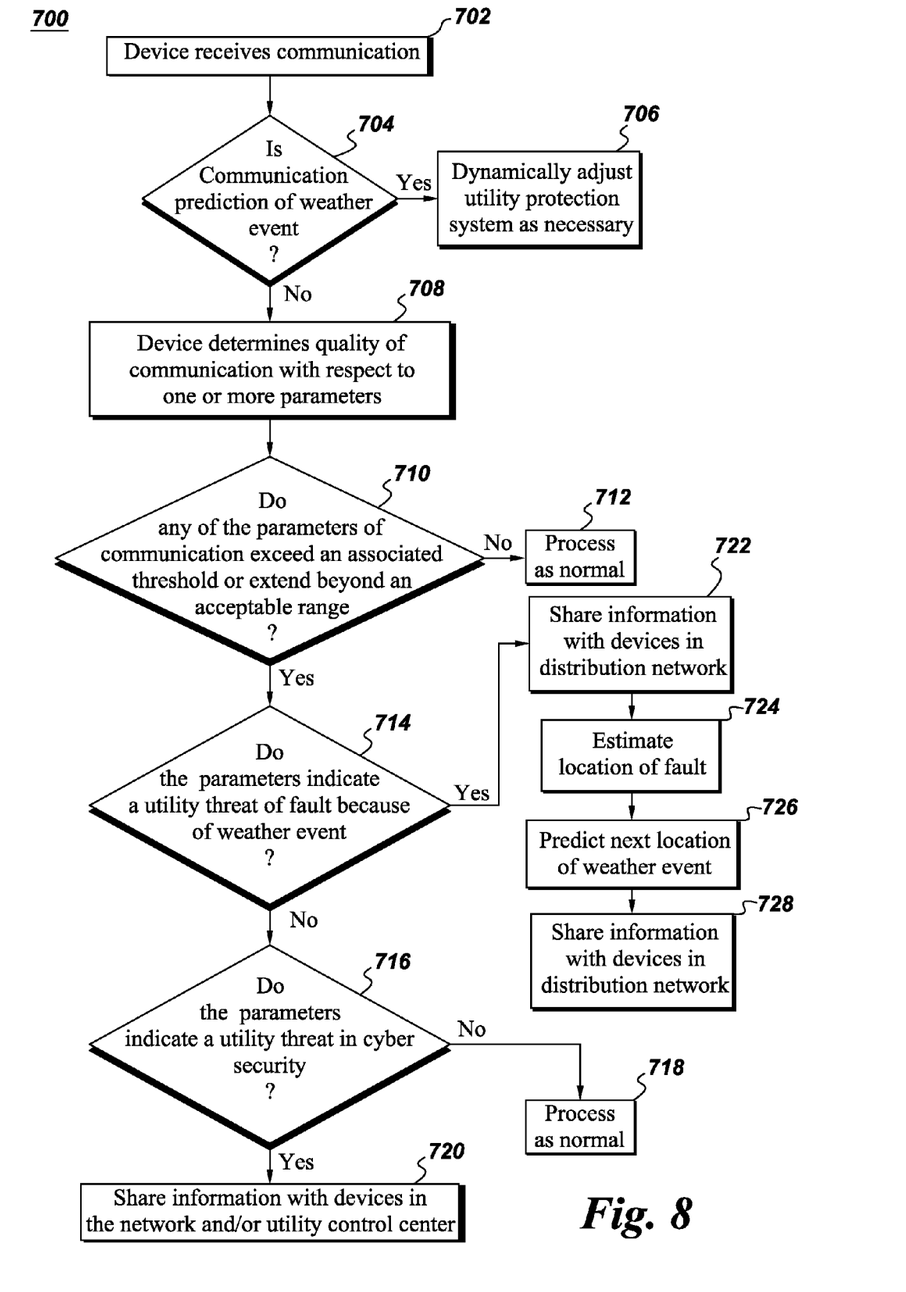
FIG. 8 illustrates a flow diagram of a grid threat monitoring process according to an exemplary embodiment.

FIG. 8 shows a flow diagram for performing utility threat assessments according to an exemplary embodiment. In step 702, a communication is received at a device 204. In step 704, the utility threat assessment module 212 determines whether the communication is a prediction of a weather event. If the answer in step 704 is yes, then processing continues to step 706 and the device 204 dynamically adjusts utility or power system protection parameters as necessary. If the answer in step 704 is no, then processing continues to step 708 where the communication quality module 214 determines the signal quality of the communication received by the device 204 based on one or more communication parameters, such as channel characteristics, for example. In step 710, the communication quality module 214 determines whether any of the communication parameters of the communication exceed an associated threshold or are outside of an acceptable range. If the answer in step 710 is no, then processing continues to step 712 where the communication is processed as normal or usual. If the answer in step 710 is yes, then processing continues to step 714 where the utility threat assessment module 212 determines whether the communication signal quality indicates a grid threat or fault due to a weather event. If the answer is no, then processing continues to step 716 where the utility threat assessment module 212 determines whether the communication signal quality indicates a grid threat in cyber security. If the answer in step 716 is no then the communication is processed as normal. If the answer in step 716 is yes, then processing continues to step 720 where the utility threat assessment manager 202 shares the possibility of a cyber security risk with the other devices 204 in the network. The information can also be communicated to the substations or appropriate substations 206, 207 and the utility 210.

Returning to step 714, if the answer in this step is yes indicating that there is a utility or grid threat or fault due to a weather event, then processing continues to step 722 where the utility threat assessment manager 202 of the device 204 shares the possibility of fault due to a weather event with the other devices 204 in the network. The information can also be communicated to the substations or appropriate substations 206, 207 and the utility 210. In step 724, the utility threat assessment module 212 estimates the location of the fault or threat based on the time and location of the device 204 or devices 204 detecting a fault or threat. In step 726, the utility threat assessment module 212 predicts the next location of the weather event. Since each device 204 knows its location, either by programmed information, GPS device, or some other method, the location of the next fault due to a weather event can be predicted. The prediction will likely become more accurate as the weather event affects other devices 204 in the distribution network. Various techniques can be applied, such as triangulation of the location of the device 204 detecting a potential threat and other devices, for example, to detect the path of the weather event. This is used to predict where the next fault or grid threat will occur. Geomagnetic storms can be a problem at certain latitudes. These storms induce potentially harmful currents into the grid or power network that result in major disruptions in the network. Communications may be more sensitive in detecting an onset of such storms. Also, power line carrier uses the actual power lines for communication. Therefore, if the power line carrier communications degrade, it can be determined that there is a power line problem. In step 728, the information predicting the next location of a fault or utility threat due to a weather event is shared with other devices 204, the substations 206, 207 and/or the utility 210.

According to embodiments of the invention, devices in a utility network having communication capability can not only be used for their designated purpose but also as a type of sensor to detect potential network operating threats including, but not limited to weather events, and cyber security events. In these embodiments, the quality of communication signals that are exchanged by devices in the network as part of their normal operation is determined and potential network operating threats can be detected based on the communication signal quality.

The computer program code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   receiving, at an intelligent electronic device, a communication from at least one of a plurality of other intelligent electronic devices in a utility network, wherein each intelligent electronic device comprises a recloser;
   determining a signal quality of the communication;
   detecting a threat to the utility network based on the signal quality of the communication; and
   outputting threat information to one or more of the intelligent electronic devices on the utility network.

2. The method of claim 1, wherein determining the signal quality of the communication comprises:
   comparing one or more communication parameters of the communication with at least one of respective thresholds or respective operating conditions; and
   detecting a change in the signal quality when one or more of the communication parameters exceeds the respective thresholds or extends outside of the respective operating ranges.

3. The method of claim 2, wherein detecting a threat to the utility network comprises:
   determining existence of the threat based on detecting the change in the signal quality of the communication.

4. The method of claim 1, wherein determining the signal quality of the communication comprises:
   comparing one or more channel characteristics of a communication channel associated with the communication to at least one of respective thresholds or repsective operating ranges; and
   detecting a change in the signal quality when one or more of the channel characteristics exceeds the respective thresholds or extends outside of the respective operating ranges.

5. The method of claim 4, wherein the channel characteristics comprises at least one of propagation delay, multipath, bit error rate, frequency, noise, interference, and embedded GPS coordinates.

6. The method of claim 4, wherein detecting a threat to the utility network comprises:
   determining existence of the threat based on detecting the change in the signal quality of the communication.

7. The method of claim 1, wherein the threat comprises a cyber threat event, and wherein the cyber threat comprises spoofing.

8. The method of claim 7, wherein the weather event is lightning strike.

9. The method of claim 1, further comprising:
   determining that the threat to the utility network is a weather event based on the signal quality of the communication;
   communicating with other devices in the utility network to estimate location of the weather event;
   predicting a path of the weather event; and
   outputting predicted path information to one or more devices in the utility network.

10. The method of claim 1, further comprising:
    receiving threat information from one or more devices in the utility network; and
    adjusting protective system settings in response to the threat information.

11. The method of claim 10, wherein the utility is a power distribution utility.

12. The method of claim 1, wherein communication in the utility network is wireless communication comprising at least one of private and public wireless communication networks, electric utility radio links-or combinations thereof.

13. A non-transitory computer-readable medium comprising computer-readable instructions of a computer program that, when executed by a processor, cause the processor to perform a method, the method comprising:
    receiving, at an intelligent electronic device, a communication from at least one of a plurality of other intelligent electronic devices in a utility network, wherein each intelligent electronic device comprises a recloser;
    determining a signal quality of the communication;
    detecting a threat to the utility network based on the signal quality of the communication; and
    outputting threat information to one or more of the intelligent electronic devices on the utility network.

14. The non-transitory computer-readable medium of claim 13, the method further comprising:
    comparing one or more communication parameters of the communication with at least one of respective thresholds or respective operating conditions; and
    detecting a change in the signal quality when one or more of the communication parameters exceeds the respective thresholds or extends outside of the respective operating ranges.

15. The non-transitory computer-readable medium of claim 13, the method further comprising:
    comparing one or more channel characteristics of a communication channel associated with the communication to at least one of respective thresholds or repsective operating ranges; and
    detecting a change in the signal quality when one or more of the channel characteristics exceeds the respective thresholds or extends outside of the respective operating ranges.

16. The non-transitory computer-readable medium of claim 13, the method further comprising:
    determining that the threat to the utility network is a weather event based on the signal quality of the communication;
    communicating with other devices in the utility network to estimate location of the weather event;
    predicting a path of the weather event; and
    outputting predicted path information to one or more devices in the utility network.

17. A system, comprising:
    an intelligent electronic device connected in a utility network, the intelligent electronic device receiving a communication from a plurality of other intelligent electronic devices in the utility network, wherein the intelligent electronic device is a recloser and comprises:
      a communication quality module to analyze the communication and determine a quality of the communication; and a utility threat assessment module to determine whether the received communication represents a threat to the utility network based on the quality of the communication.

18. The system of claim 17, further comprising:
a database coupled to the utility threat assessment device to store utility threat data.

19. The system of claim 17, wherein the communication quality module is configured to:
compare one or more channel characteristics of a communication channel associated with the communication to at least one of respective thresholds or repsective operating ranges; and
detect a change in the signal quality when one or more of the channel characteristics exceeds the respective thresholds or extends outside of the respective operating ranges.

20. The system of claim 17, wherein the utility threat assessment module is configured to:
determine that the threat to the utility network is a weather event based on the signal quality of the communication;
communicate with the other intellegent electronic devices in the utility network to estimate location of the weather event;
predict a path of the weather event; and
output predicted path information to one or more of the other intellegent electronic devices in the utility network.

21. The method of claim 4, wherein the channel characteristics comprises signal strength.

22. The method of claim 1, wherein the threat comprises a weather event.

* * * * *